United States Patent [19]
Maravetz

[11] 3,721,711
[45] March 20, 1973

[54] CYCLOALKANE CARBOXALDOXIME CARBAMATES

[75] Inventor: Lester L. Maravetz, Westfield, N.J.

[73] Assignee: Esso Research and Engineering Company

[22] Filed: April 29, 1970

[21] Appl. No.: 33,059

[52] U.S. Cl. ........260/566 AC, 260/566 A, 260/598, 424/327
[51] Int. Cl. ............................................C07c 131/02
[58] Field of Search ................424/327; 260/566 AC

[56] References Cited

UNITED STATES PATENTS 3,479,405   11/1969   Payne et al......................260/566 AC

OTHER PUBLICATIONS

Payne et al., J. Agr. Food Chem. vol. 14, pp. 356–365 (1966)

Primary Examiner—Leon Zitver
Assistant Examiner—Gerald A. Schwartz
Attorney—Chasan and Sinnock and John Paul Corcoran

[57] ABSTRACT

Chemical compounds useful as pesticides and characterized by the following structure:

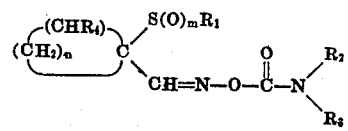

wherein $R_1$ is $C_1$—$C_4$ alkyl and $R_2$, $R_3$ and $R_4$ are the same or different and are hydrogen or $C_1$—$C_4$ alkyl; $n$ is 1 to 6 and $m$ is 0, 1 or 2.

5 Claims, No Drawings

CYCLOALKANE CARBOXALDOXIME CARBAMATES

This invention relates to novel chemical compounds finding utility as pesticides. In one aspect, this invention is concerned with the employment of substituted cycloalkanecarboxaldoxime carbamates as useful insecticides and ovicides.

There has been previous work performed relating to the synthesis of carbamate derivatives of substituted aldoximes and their use as pesticides. U.S. Pat. No. 3,217,037 issued on Nov. 9, 1965 and assigned to Union Carbide Corporation, discloses a number of aldoximes having the following structure:

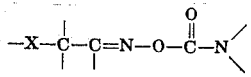

wherein X represents a divalent Group VI element having an atomic number between 7 and 17 in any oxidation state. The free valences of the structure above are optionally satisfied by hydrogen or hydrocarbyl radicals monovalently bonded through a carbon atom of the radical. These compounds are said to have very excellent miticidal activity and one of the compounds in this group is sold under the tradename "Temik" and has the following structure:

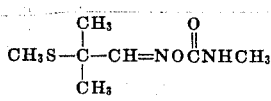

The Journal of Agricultural and Food Chemistry, Vol. 14, No. 4, 1966, pages 356 to 365, contains an article entitled "The Synthesis and Insecticidal Properties of Some Cholenergic Trisubstituted Acetaldehyde O-(methylcarbamoyl) Oximes." This article describes a study relating to the intrinsic insecticidal activity of aliphatic oxime carbamates. On page 360 of this article, there is described some compounds which deviate from the acyclic systems of the above-identified patent and describe cyclo systems wherein the carbon atom bivalently bonded to the nitrogen atom in the radical set forth hereinabove forms part of a ring system. Such a system forms a ketoxime carbamate and in Table V on page 360 of this article, compounds 45 through 48 inclusive, demonstrate that the insecticidal activity of such structures is materially lower than many of those with the acyclic backbone referred to hereinabove.

The compounds of this invention generally comprise the basic structure:

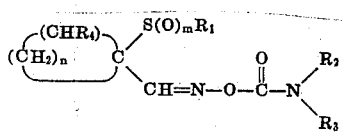

wherein $R_1$ is $C_1$–$C_4$ alkyl and $R_2$, $R_3$ and $R_4$ are the same or different and are hydrogen or $C_1$–$C_4$ alkyl, $n$ is 1–6 and $m$ is 0, 1 or 2.

It has been surprisingly discovered that the cyclic structures above, in which the carbon atom bivalently bonded to the nitrogen atom is also bonded with a hydrogen atom, e.g. cyclic aldoxime carbamates have excellent insecticidal activity as a whole, and they also may in some cases possess superior coleoptera activity when compared to the acyclic systems described in the aforesaid patent.

As specifically exemplary of the novel compounds, there can be mentioned the oxime carbamates derived from 1-(methylthio)cycloalkane carboxaldehydes and oxidized analogues thereof.

Exemplary compounds defined by the structural formula hereinabove are:

| Compound No. | |
|---|---|
| 1 | 1-(methylthio)cyclopropanecarboxaldehyde O-(methylcarbamoyl)oxime |
| 2 | 1-(methylthio)cyclobutanecarboxaldehyde O-(methylcarbamoyl)oxime |
| 3 | 1-(methylthio)cyclopentanecarboxaldehyde O-(methylcarbamoyl)oxime |
| 4 | 1-(methylthio)cyclohexanecarboxaldehyde O-(methylcarbamoyl)oxime |
| 5 | 1-(methylthio)cycloheptanecarboxaldehyde O-(methylcarbamoyl)oxime |
| 6 | 1-(methylthio)cyclooctanecarboxaldehyde O-(methylcarbamoyl)oxime |
| 7 | 1-(methylsulfinyl)cyclopropanecarboxaldehyde O-(methylcarbamoyl)oxime |
| 8 | 1-(methylsulfinyl)cyclobutanecarboxaldehyde O-(methylcarbamoyl)oxime |
| 9 | 1-(methylsulfinyl)cyclopentanecarboxaldehyde O-(methylcarbamoyl)oxime |
| 10 | 1-(methylsulfinyl)cyclohexanecarboxaldehyde O-(methylcarbamoyl)oxime |
| 11 | 1-(methylsulfinyl)cycloheptanecarboxaldehyde O-(methylcarbamoyl)oxime |
| 12 | 1-(methylsulfinyl)cyclooctanecarboxaldehyde O-(methylcarbamoyl)oxime |
| 13 | 1-(methylsulfonyl)cyclopropanecarboxaldehyde O-(methylcarbamoyl)oxime |
| 14 | 1-(methylsulfonyl)cyclobutanecarboxaldehyde O-(methylcarbamoyl)oxime |
| 15 | 1-(methylsulfonyl)cyclopentanecarboxaldehyde O-(methylcarbamoyl)oxime |
| 16 | 1-(methylsulfonyl)cyclohexanecarboxaldehyde O-(methylcarbamoyl)oxime |
| 17 | 1-(methylsulfonyl)cycloheptanecarboxaldehyde O-(methylcarbamoyl)oxime |
| 18 | 1-(methylsulfonyl)cyclooctanecarboxaldehyde O-(methylcarbamoyl)oxime |
| 19 | 1-(ethylthio)cyclopropanecarboxaldehyde O-(methylcarbamoyl)oxime |
| 20 | 1(n-propylthio)cyclobutanecarboxaldehyde O-(methylcarbamoyl)oxime |
| 21 | 1-(ethylthio)cyclohexanecarboxaldehyde O-(methylcarbamoyl)oxime |
| 22 | 1-(methylthio)cyclopropanecarboxaldehyde O-(carbamoyl)oxime |
| 23 | 1-(methylthio)cyclohexanecarboxaldehyde O-(carbamoyl)oxime |
| 24 | 1-(methylthio)-2-methylcyclopropanecarboxaldehyde O-(methylcarbamoyl)oxime |
| 25 | 1-(methylthio)-2-methylcyclohexanecarboxaldehyde O-(methylcarbamoyl)oxime |
| 26 | 1-(methylthio)cyclopropanecarboxaldehyde O-(ethylcarbamoyl)oxime |
| 27 | 1-(methylsulfinyl)cyclopropanecarboxaldehyde O-(carbamoyl)oxime |
| 28 | 1-(methylthio)cyclopropanecarboxaldehyde O-(dimethylcarbamoyl)oxime |
| 29 | 1-(methylthio)-2-ethylcyclopropanecarboxaldehyde O-(methylcarbamoyl)oxime |
| 30 | 1-(methylthio)-2-n-butylcyclopropanecarboxaldehyde O-(methylcarbamoyl)oxime |

The compounds of this invention can be prepared via the alpha halogenation of cyclic carboxylic acids under slightly modified Hell-Volhard-Zelinsky conditions followed by esterification to give the cyclic alpha halocycloalkanecarboxylic acid ester. The active halogen is easily displaced with sodium alkyl mercaptide in alcohol to yield the alkylthio ester.

Hydrolysis of the ester followed by reacting the hydrolyzed product with thionyl chloride gives the reactive acid chloride which is transformed into the aldehyde via the method of H. C. Brown and A. Tsukamoto, J. Am. Chem. Soc. 83, 4559 (1961).

Further reaction of the aldehyde with hydroxylamine hydrochloride in base gives the corresponding oxime which in turn can be carbamoylated with suitable reagents to form the final insecticidal agent. Sulfoxide or sulfone analogues can be prepared by oxidation of the basic compounds with the proper number of equivalents of peroxide or peracid.

Such a synthesis procedure is illustrated schematically as follows:

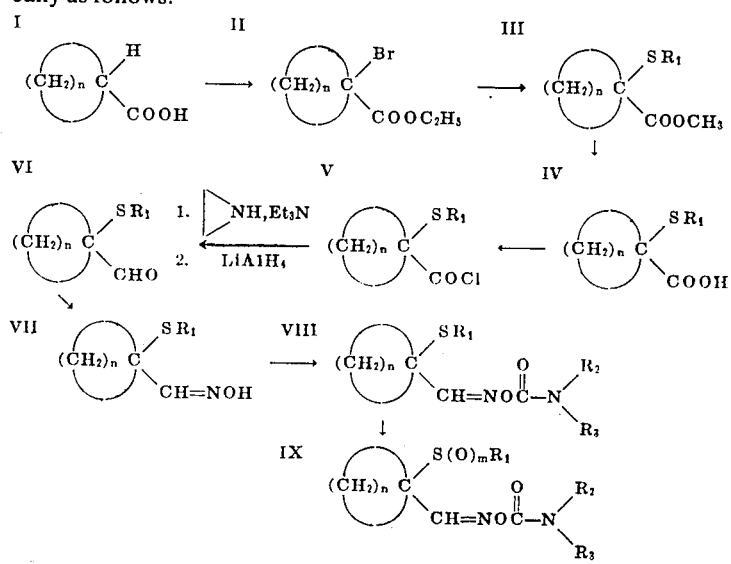

In the case where n is 2, the compounds according to the subject invention cannot be prepared by the above-identified scheme. Reaction of cyclopropanecarboxylic acid under the Hell-Volhard-Zelinsky halogenation causes the cyclopropane ring to open. Therefore, a partial alternate route was developed as shown below:

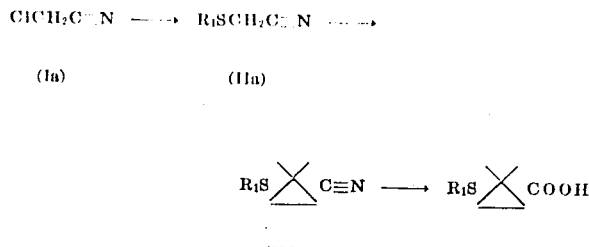

The compound IVa is the same as compound IV in the above schematic diagram and therefore steps V, VI, VII, VIII and IX are the same as discussed hereinabove.

General specifications of conditions under which the above reactions may be carried out are outlined in the following Table:

TABLE

| Reactants | Molar ratio Broad, m. | Molar ratio Preferred, m. | Temperature Broad, °C. | Temperature Preferred, °C. | Pressure Broad, atm. | Pressure Preferred, atm. | Solvents Broad | Solvents Preferred |
|---|---|---|---|---|---|---|---|---|
| I ——→ II | | | | | | | | |
| Carboxylic acid | 1.0 | 1.0 | | | | | | |
| Thionyl chloride | 1.0–20 | 1.1 | | | | | | |
| Red phosphorous | 0.01–0.5 | 1.1 | 0–100 | 80–90 | 0.1–4 | 1 | Benzene, toluene, chlorinated hydrocarbons. | None. |
| Bromine | 1.0–5.0 | 1.2 | | | | | | |
| Ethanol | 1.0–20 | 3.0 | | | | | | |
| II ——→ III | | | | | | | | |
| Bromo ester | 1.0 | 1.0 | | | | | | |
| Sodium | 1.0–2.0 | 1.1 | –30–100 | –10–65 | 0.1–4 | 1 | Methanol | Methanol. |
| Alkyl mercaptan | 1.0–2.0 | 1.1 | | | | | | |
| Methanol | 4–20 | 10 | | | | | | |
| III ——→ IV | | | | | | | | |
| Alkylthio-ester | 1.0 | 1.0 | | | | | | |
| Alkaline hydroxide | 1.0–5.0 | 1.2 | 40–100 | 60–100 | 0.1–4 | 1 | Water, alcohols, alcohol-water mixtures. | Ethanol-water, methanol-water. |
| Hydrochloric acid | 1.0–5.0 | 1.5 | | | | | | |
| IV ——→ V | | | | | | | | |
| Alkylthio-acid | 1.0 | 1.0 | –15–100 | 0–80 | 0.1–4 | 1 | Thionyl chloride, benzene, toluene, xylene, chlorinated hydrocarbons. | Thionyl chloride. |
| Thionylchloride | 1.0–10 | 2.2 | | | | | | |
| V ——→ VI | | | | | | | | |
| Alkylthio-acid chloride | 1.0 | 1.0 | | | | | | |
| Ethyleneimine | 1.0–10 | 1.2 | 0–50 | 10–30 | 0.1–4 | 1 | Ethers, benzene, toluene, xylene. | Diethyl ether. |
| Triethylamine | 1.0–10 | 1.2 | | | | | | |
| Lithium aluminum hydride | 0.6–1.0 | 0.6 | | | | | | |
| VI ——→ VII | | | | | | | | |
| Alkylthioaldehyde | 1.0 | 1.0 | | | | | | |
| Hydroxylamine hydrochloride | 1.0–3.0 | 1.1 | –10–100 | –10–50 | 0.1–4 | 1 | Water, acetonitrile alcohols, alcohol/water. | Water. |
| Alkaline hydroxide or bicarbonate | 1.0–3.0 | 1.2 | | | | | | |
| VII ——→ VIII | | | | | | | | |
| Alkylthio-aldoxime | 1.0 | 1.0 | –15–150 | 25–80 | 0.1–4 | 1 | Ethers, benzene, toluene, xylene, chlorinated hydrocarbons. | Diethyl ether benzeene. |
| Carbamoylating agent e.g. (methyliscocyanate for $R_2$=$CH_3$, $R_3$=H). | 1.0–10 | 1.2 | | | | | | |
| VIII ——→ IX | | | | | | | | |
| Alkylthio-carbamate | 1.0 | 1.0 | 0–60 | 0–30 | 0.1–4 | 1 | Ethyl acetate, water | Ethyl acetate. |
| Peracetic acid | 1.0–10 | 1.0–2.1 | | | | | | |

The details of this route Ia to IV are given in the following Table.

TABLE

| Reactants | Molar ratio | | Temperature | | Pressure | | Solvents | |
|---|---|---|---|---|---|---|---|---|
| | Broad, m. | Preferred, m. | Broad, °C. | Preferred, °C. | Broad, atm. | Preferred, atm. | Broad | Preferred |
| Ia→IIa | | | | | | | | |
| Chloroacetonitrile | 1.0 | 1.0 | −30–100 | 0–65 | 0.1–4 | 1 | Methanol | Methanol. |
| Alkylmercaptan | 1.0–2.0 | 1.1 | | | | | | |
| Sodium | 1.0–2.0 | 1.1 | | | | | | |
| IIa→IIIa | | | | | | | | |
| Alkylthio-nitrile | 1.0 | 1.0 | −100–100 | −70–35 | 0.1–4 | 1 | Ethers, benzene | Diethyl ether. |
| Sodium amide | 2.0–3.0 | 2.1 | | | | | | |
| 1,2-dibromoethane | 1.0–2.0 | 1.1 | | | | | | |
| IIIa→IV | | | | | | | | |
| Cyclic alkylthio nitrile | 1.0 | 1.0 | 0–150 | 50–90 | 0.1–4 | 1 | Water, MeOH, ethanol | Water. |
| Hydrochloric acid | 1.0–2.0 | 2.0 | | | | | | |

The intermediate oximes developed in the synthesis of our final products have the following structure:

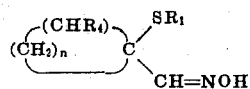

Exemplary of compounds falling within the scope of the structure set forth hereinabove are as follows:
1-(methylthio)cyclopropanecarboxaldehyde oxime
1-(methylthio)cyclobutanecarboxaldehyde oxime
1-(methylthio)cyclopentanecarboxaldehyde oxime
1-(methylthio)cyclohexanecarboxaldehyde oxime
1-(methylthio)cycloheptanecarboxaldehyde oxime
1-methylthio)cyclooctanecarboxaldehyde oxime
1-(ethylthio)cyclopropanecarboxaldehyde oxime
1-(n-propylthio)cyclobutanecarboxaldehyde oxime
1-(ethylthio)cyclohexanecarboxaldehyde oxime
1-(methylthio)-2-methylcyclopropanecarboxaldehyde oxime
1-(methylthio)-2-methylcyclohexanecarboxaldehyde oxime
1-(methylthio)-2-ethylcyclopropanecarboxaldehyde oxime
1-(methylthio)-2-n-butylcyclopropanecarboxaldehyde oxime The intermediate aldehyde derivatives possess the following structure:

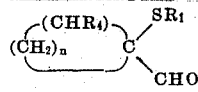

Exemplary of compounds falling within the scope of the structure set forth hereinabove are as follows:
1-(methylthio)cyclopropanecarboxaldehyde
1-(methylthio)cyclobutanecarboxaldehyde
1-(methylthio)cyclopentanecarboxaldehyde
1-(methylthio)cyclohexanecarboxaldehyde
1-(methylthio)cycloheptanecarboxaldehyde
1-(methylthio)cyclooctanecarboxaldehyde
1-(ethylthio)cyclopropanecarboxaldehyde
1-(n-propylthio)cyclobutanecarboxaldehyde
1-(ethylthio)cyclohexanecarboxaldehyde
1-(methylthio)-2-methylcyclopropanecarboxaldehyde
1-(methylthio)-2-methylcyclohexanecarboxaldehyde
1-(methylthio)-2-n-butylcyclopropanecarboxaldehyde
1-(methylthio)-2-ethylcyclopropanecarboxaldehyde The present invention is further illustrated in greater detail by the following examples, but it is to be understood that the present invention in its broadest aspect is not necessarily limited in terms of the reactants or specific temperature, residence times, separation techniques and other process conditions, etc; or dosage level, exposure times, test plants used, etc. by which the compounds and/or compositions described and claimed are prepared and/or used.

EXAMPLE 1

1-(Methylthio)cyclopropanecarboxaldehyde

One of the starting materials, namely, methylthioacetonitrile, was prepared from chloroacetonitrile according to the procedure reported in the literature by A.I. Kiprianov et al [J. Gen. Chem. (USSR) 6, 576–83 (1936)]. This compound had a boiling range of from 58° to 60°C. at 13 mm. of pressure.

Anal. Calc. for $C_3H_5NS$: C, 41.3; H, 5.7; N, 16.1
Found: C, 41.5; H, 5.7; N, 16.0.

In order to produce 1-(methylthio)cyclopropanecarbonitrile, a suitable reaction vessel was charged with sodium amide (148.5 grams, 3.81 moles) and anhydrous ethyl ether (600 ml). An inert nitrogen gas atmosphere was held over the stirred slurry as methylthioacetonitrile (160 g., 1.84 moles) was added dropwise over a 2½ hour period. Additional ether (400 ml.) was added to the mixture which was then refluxed for 5 hours and allowed to stir at room temperature for about 15 hours. The stirred slurry was cooled by means of a dry ice-acetone both at −60° to −70°C. during the addition of 1,2-dibromoethane (346 g., 1.84 moles). After addition was complete (1½ hours), the entire reaction mixture was allowed to warm up slowly to about 15°C. A warm water bath was applied for a short time until a mild exothermic reaction occurred. The bath was removed and spontaneous refluxing occurred as ammonia exited through the condenser. After the reaction subsided, the mixture was heated at reflux, for 2 hours longer, cooled, and poured cautiously with stirring into ice water. The two layers which formed were separated and the ethereal layer washed consecutively with water, 5% aqueous HCl, and water again. The solution was dried with magnesium sulfate, filtered, and the solvent removed under reduced pressure. The residue was distilled under vacuum to give about 35 g of product. B.p. 70°–73°C./17 mm.

Anal. Calc. for $C_5H_7NS$: C, 53.0; H, 6.23; N, 12.4; S, 28.2

Found: C, 52.5; H, 6.15; N, 11.9; S, 28.5

1-(Methylthio)cyclopropane carboxylic acid was prepared by forming a mixture of 1-(methylthio)cyclopropanecarbonitrile (9.15 g, 0.081 mole) and concentrated hydrochloric acid (16.3 cc) which was heated at 85°C. for approximately 15 hours. To the resulting slurry of solids after cooling was added diethylether with stirring. The solids were removed by filtration and extracted further with warm ether. All ethereal filtrates were combined and stripped via a rotating evaporator to a residue of moist-looking solids. Water (70 ml) was added followed by 6 ml of 50 percent sodium hydroxide solution with agitation. The strongly basic clear solution was extracted once with ether and the aqueous basic phase was acidified with stirring by drop-wise addition of concentrated hydrochloric acid (about 7.5 ml). During this addition a reddish oil separated and chilling of the mixture precipitated pale yellow solids. The solids were filtered cold, air dried and dissolved in ether. A small amount of insoluble tan material was removed by filtration and stripping of the solvent gave 5.91 g of white waxy solids, m.p. 49°–53°C.

Anal. Calc. for $C_5H_8O_2S$: C, 45.4; H, 6.09

Found: C, 45.31; H, 6.49.

For the preparation of 1-(methylthio)cyclopropanecarboxylic acid chloride, a flask was charged with 1-(methylthio)-cyclopropanecarboxylic acid (8.9 g, 0.067 mole) and to the acid was added thionyl chloride (18.5 g, 0.155 mole) all at once with stirring. Spontaneous bubbling occurred as an endothermic reaction occurred causing the reaction temperature to drop below 10°C. The mixture was stirred for about 30 minutes and then heated at about 78°C. for 2 hours. The excess thionyl chloride was removed at room temperature and reduced pressure and the residue vacuum distilled to give the product as a clear pale yellow oil, 7.84 g, b.p. 51°C/2.9 mm.

For the preparation of 1-(methylthio)cyclopropanecarboxaldehyde, a reaction flask was charged with ethylenimine (14.64 g., 0.34 mole) and triethylamine (34.4 g., 0.34 mole) in 850 ml. of anhydrous ether was added dropwise a solution of 1-(methylthio)cyclopropanecarboxylic acid chloride (49.0 g., 0.326 moles) in 100 ml dry ether in three hours. The temperature during this addition was kept below 30°C. An additional 200 ml of dry ether was added later to facilitate the stirring of the slurry of white solids which formed. Stirring at room temperature was continued for about 15 hours. The solids which were than filtered off and washed with ether were air dried. The yield of this triethylamine hydrochloride salt was quantitative.

The ethereal filtrate containing the intermediate amide was transferred into a reaction flask and to this stirred solution was added at −15° to −10°C. an ethereal slurry of lithium aluminum hydride (6.2 g., 0.163 moles) in spurts over 1¼ hours. The resulting reaction mixture was stirred at −10°C. for about 1 hour and then the temperature was allowed to rise to about 20°C. over the next hour. Then after chilling again to about 0°C., 5N $H_2SO_4$ (100 ml) was added cautiously dropwise while the temperature was kept below 10°C. The granular solids which formed were removed by filtration and the filtrate was washed with water (1 × 300 ml), 10 percent sodium bicarbonate solution (1 × 300 ml) and water again (3 × 300 ml). The washed ethereal solution was dried with $MgSO_4$ and the solvent removed at reduced pressure. The oily residue was vacuum distilled to give the aldehyde, 24.6 g., b.p. 58°–60/6 mm.

Anal. Calc. for $C_5H_8OS$: C, 51.8; H, 6.93

Found: C, 51.7; H, 6.98.

EXAMPLE 2

1-(Methylthio)cyclopropanecarboxaldehyde Oxime

For the preparation of 1-(methylthio)cyclopropanecarboxaldehyde oxime, to a solution of hydroxylamine hydrochloride (20.8 g., 0.207 mole) in 175 ml of water chilled at 0°C. was added a solution of $NaHCO_3$ (26.0 g., 0.31 mole) in 325 ml. of water over a period of 10 minutes. To the resulting clear solution at 0°C. was added 1-(methylthio)cyclopropanecarboxaldehyde (24.1 g., 0.207 mole) with vigorous stirring over a one-half hour period. After room temperature was attained, the mixture was warmed to 47°C. and then chilled to 10°C. at which temperature a crystalline solid formed. The entire mixture was extracted with ether three times and after drying the ether extracts with $MgSO_4$ and removing the solvent at reduced pressure the oxime was isolated as a waxy white solid (26.1 g.).

Anal. Calc. for $C_5H_9NOS$: C, 45.7; H, 6.91; S, 24.4

Found: C, 45.4; H, 6.73; S, 24.6.

EXAMPLE 3

1-(Methylthio)cyclopropanecarboxaldehyde O-(MethylCarbamoyl)Oxime

In the preparation of 1-(methylthio)cyclopropanecarboxaldehyde O-(methylcarbamoyl) oxime, 1-(methylthio)cyclopropanecarboxaldehyde oxime (15.0 g., 0.114 mole) was dissolved in ether (200 ml) along with 12 drops of dibutyltindiacetate. To this stirred solution was added dropwise methyl isocyanate (8.57 g., 0.15 mole) in 65 ml of ether over a period of 50 minutes. The clear solution was stirred at ambient temperature for 40 minutes and then refluxed for 16 hours. The clear solution was chilled well below 0°C. and the resulting white solids which formed were filtered cold. The yield of the oxime carbamate was 12.25 g.

Additional product could be obtained from the filtrates.

Anal. Calc. for $C_7H_{12}N_2O_2S$: C, 44.7; H, 6.42; S, 17.0

Found: C, 44.5; H, 6.50; S, 17.0.

EXAMPLE 4

1-(Methylthio)cyclobutanecarboxaldehyde

In following the alternate procedure set out schematically on page 9 hereinabove in the preparation of ethyl 1-bromocyclobutanecarboxylate, thionyl chloride (13.1 g., 0.11 mole) was added all at once to cyclobutanecarboxylic acid (10.0 g., 0.1 mole) and the mixture was heated to about 80°–90°C. for 45 minutes. After cooling the clear solution, red phosphorous (0.14 g.) was added followed by dropwise addition of bromine (20.0 g., 0.125 mole) over a 10 minute period as the temperature rose to about 40°C. Heating at 80°–90°C. was maintained for about two hours followed by cooling to room temperature. Absolute ethanol (14 ml) was added dropwise with stirring and the temperature rose to 70°C. momentarily. The mixture was stirred at room temperature overnight, 30 ml of water was added, and stirring was continued until the reddish color of bromine had disappeared. The two phase system was extracted with ether, the aqueous phase extracted again with ether, and the ether extracts dried with $MgSO_4$. The crude oily residue obtained upon stripping the solvent weighed 19.1 g. Vacuum distillation gave 16.1 g. of product ester, b.p. 50°–51°S./1.5 mm.

Anal. Calc. for $C_7H_{11}BrO_2$: Br, 38.6
Found: Br, 37.4.

In preparing methyl 1-methylthiocyclobutanecarboxylate, sodium metal (16.6 g., 0.72 mole) was dissolved in about 400 ml of methanol. The solution was chilled to 0° to −10°C. and methylmercaptan (34.6 g., 0.72 mole) was added followed by warming of the solution to 40°C. for 20 minutes. Again, the solution was cooled to 0°C. and ethyl-1-bromocyclobutanecarboxylate (145 g., 0.7 mole) was added dropwise over 45 minutes. The clear solution was heated at about 65°C. for 12 hours and the resulting white solids were removed by filtration. After removal of the methanol from the filtrate, the residue was combined with 150 ml of water. The oily organic layer which formed was extracted with ether. The aqueous phase was extracted once with ether and the combined ether extracts were dried with $MgSO_4$. Solvent removal followed by vacuum distillation of the residue gave 83.2 g. of ester, b.p. 55°–60.5°C./2.5 mm. A nuclear magnetic resonance spectrum of the product indicated that trans-esterification had occurred in the methanol solvent and the resultant product was mainly the methyl ester rather than the ethyl ester.

Anal. Calc. for $C_7H_{12}O_2S$: C, 52.4; H, 7.54
Found: C, 53.7; H, 7.27

In the preparation of 1-(methylthio)cyclobutanecarboxylic acid, to a solution of potassium hydroxide (42.1 g., 0.75 mole) in 550 ml of water and 600 ml of ethanol was added methyl 1-methylthiocyclobutanecarboxylate (77.0 g., 0.48 mole) and the solution was refluxed for 2 days. The ethanol and some of the water was removed at reduced pressure and the residue was extracted with ether once to remove any unreacted ester. The aqueous solution was then acidified slowly with hydrochloric acid and the oil which formed solidified upon cooling. The white solids were filtered cold and taken up into ether. Some ether insoluble material was removed by filtration and discarded. The ether solution after drying with $MgSO_4$ yielded 61 g. of oil which later solidified, m.p. 35°–38°C.

Anal. Calc. for $C_6H_{10}O_2S$: C, 49.3; H, 6.88; S, 21.92
Found: C, 49.5; H, 6.79; S, 21.25.

For the preparation of 1-(methylthio)cyclobutanecarboxylic acid chloride, using the same procedure as shown above in Example 1, 1-(methylthio)cyclobutanecarboxylic acid was converted to the corresponding acid chloride in 89 percent yield. B.p. 47°–50°C./1.2 mm.

In the preparation of 1-(methylthio)cyclobutanecarboxaldehyde, the same procedure as shown in the synthesis of 1-(methylthio)cyclopropanecarboxaldehyde was used to convert 1-(methylthio)cyclobutanecarboxylic acid chloride into the corresponding aldehyde in 71 percent yield. B.p. 32°–33.5°C./0.6 mm.

Anal. Calc. for $C_6H_{10}OS$: C, 55.3; H, 8.28
Found: C, 55.5; H, 7.88

EXAMPLE 5

1-(Methylthio)cyclobutanecarboxaldehyde Oxime

In the preparation of 1-(methylthio)cyclobutanecarboxaldehyde oxime, the same general procedure as shown in the synthesis of 1-(methylthio)cyclopropanecarboxaldehyde oxime was used to convert 1-(methylthio)cyclobutanecarboxaldehyde into the corresponding oxime in 84.7 percent yield. B.p. 65°–66°C./0.45 mm.

Anal. Calc. for $C_6H_{11}NOS$: C, 49,6; H, 7.63; N, 9.65
Found: C, 49.6; H, 7.70; N, 9.31.

EXAMPLE 6

1-(methylthio)cyclobutanecarboxaldehyde O-(Methylcarbamoyl) Oxime

In the preparation of 1-(methylthio)cyclobutanecarboxaldehyde O-(methylcarbamoyl)oxime, the same manner of preparing 1-(methylthio)cyclopropanecarboxaldehyde O-(methylcarbamoyl)oxime was used to convert 1-(methylthio)-cyclobutanecarboxaldehyde oxime to the corresponding oxime carbamate in 78 percent yield.

Anal. Calc. for $C_8H_{14}N_2O_2S$: C,47.4; H,6.97; N,13.85;
S, 15.82; Found: C,47.4; H,7.07; N,13.97; S, 15.80.

EXAMPLE 7

1-(Methylsulfinyl)cyclobutanecarboxaldehyde O-(Methylcarbamoyl) Oxime

In the preparation of 1-(methylsulfinyl)cyclobutanecarboxaldehyde O-(methylcarbamoyl)oxime, to a stirred solution of 1-(methylthio)cyclobutanecarboxaldehyde O-(methylcarbamoyl) oxime (5.0 g., 0.0246 mole) in 50 ml of ethylacetate was added dropwise 3.2 ml of 40 percent peracetic acid to which had been added 0.5 g of sodium acetate trihydrate. A slight exothermic reaction was noted and the temperature was kept below 30°C. during the half hour addition. After stirring at ambient temperature for 15 hours, a small quantity of white solids was removed by filtration and discarded. The solvent was removed under reduced pressure and the residue was stirred with cold hexane. This was then decanted away from the waxy white solids and replaced with ether. Trituration of the residue gave a fine granular material which was isolated by filtration. The weight of dry product was 4.92 g. M.p. 118°–121°C.

Anal. Calc. for $C_8H_{14}N_2O_3S$: C, 43.9; H, 6.47; N, 12.83; S,14.6

Found: C, 44.4; H, 6.63; N, 12.50; S, 14.4.

EXAMPLE 8

1-(Methylsulfonyl)cyclobutanecarboxaldehyde O-(Methylcarbamoyl) Oxime

For the preparation of 1-(methylsulfonyl)cyclobutanecarboxaldehyde O-(methylcarbamoyl)oxime, in the same general procedure as in the previous example, 1-(methylthio) cyclobutanecarboxaldehyde O-(methylcarbamoyl)oxime (5.0 g., 0.0246 mole) dissolved in 50 ml of ethyl acetate was reacted with 6.4 ml of 40 percent peracetic acid to which had been added 1 g. of sodium acetate trihydrate. Shortly after the completion of the oxidant addition copious white solids formed. Most of these solids dissolved upon addition of more ethyl acetate and stirring was continued for 48 hours at room temperature. The solution was warmed on a steam bath and filtered hot to remove some insoluble material. The filtrate upon concentration under vacuum, chilling, and filtration gave the product as a white crystalline solid, 4.0 g. M.p. 133°–35°C.

Anal. Calc. for $C_8H_{14}N_2O_4S$: C, 40.9; H, 6.02; N, 11.96

Found: C, 41.29; H, 6.00; N, 11.94

The compounds of the invention have general insecticidal properties.

Insecticidal compositions of the invention are prepared by admixing one or more of the active ingredients defined hereinabove, insecticidally effective amounts with a conditioning agent of the kind used and referred to in the art as a pest control adjuvant or modifier to provide formulations adapted for ready and efficient application to soil or plants using conventional applicator equipment.

The insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50 percent by weight or more concentration of the active ingredient can be obtained in solution.

The insecticidal compositions of the invention whether in the form of dusts or liquids, preferably also include a surface-active agent sometimes referred to in the art as a wetting dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15 percent by weight of the composition, and in certain compositions the percentage will be 1 percent or less. Usually, the minimum lower concentration will 0.1 percent.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals — although subsequently subjected to grinding, sieving, purification, and/or other treatments — including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of this invention.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, of a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275°F. to about 575°F., or boiling in the range of about 575°F. to about 1,000°F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about six to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters of sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient of by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers, hydrocarbons; etc.

Where the toxicant itself is a liquid these materials can be sprayed on crops or insects without further dilution.

Petroleum hydrocarbon fractions used as solvents should preferably have a flash point above 73°F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

In the examples which follow, the new oxime carbamates of the subject invention were applied to insects in the greenhouse and in the laboratory to determine their biological activity.

The experimental compounds were tested as aqueous emulsions. These emulsions were prepared by dissolving the compound in acetone and dispersing it in distilled water with Triton X–100, an alkylaryl polyether alcohol derived by the reaction of 1-octylphenol with ethylene oxide to give spray emulsions containing the desired concentration of the compound. These emulsions were then used in standard laboratory tests described below.

Mexican Bean Beetle

Bean leaves were dipped in the emulsion of the test chemical and allowed to dry. The individually treated leaves were placed in Petri dishes and 5 Mexican bean beetle larvae introduced into each of the two replica dishes.

Mite Contact

Potted bean plants infested with the two spotted spider mites were placed on a turntable and sprayed with a formulation of the test chemical. The plants were held for 7 days and the degree of mite control was rated after this period.

Mite Systemic

Bean plants were treated by applying 20 milliliters of the formulated test chemical to the soil. The mites were transferred to the plants after 24 hours. Plants were held for 7 more days and the degree of mite control rated.

Aphid Contact

Potted nasturtium plants infested with the bean aphids were placed on a turntable and sprayed with a formulation of the test chemical. The plants were held for two days and the degree of aphid control was rated.

Aphid Systemic

Nasturtium plants were treated by applying 20 milliliters of the formulated test chemical to the soil. The mites were transferred to the plant after 24 hours. The plants were held for 48 additional hours and the degree of the aphid control rated.

Boll Weevil

Five mixed sex adult boll weevils placed in a wire screen cage were sprayed with the proper concentration of formulated test chemical. The boll weevils were provided with sucrose solution on a filter paper. The cages were held at about 70°F. for 24 hours and the percent mortality read after 24 hours.

Ovicide Test

Packages of Mexican Bean Beetle, Red Banded Leaf Roller, and Southern Army Worm eggs (48 hours old and 75 to 100 eggs in each package) were dipped for 1 minute in suitable concentrations of the test compound. The packages were placed on a leaf in a cup. After 48 hours, readings were taken for ovicidal action of the chemicals.

German Cockroach

Caged cockroaches were sprayed with the formulated test chemical of suitable concentration. After 2 days, the degree of German cockroach control was rated.

Nematode

One hundred twenty-five cc of an air dried soil-sand mixture (2:1) was infested with a stock of root-knot nematode prepared 7–10 days previously (at the rate of 6–7 grams of chopped galls/gallon of soil). 10 ml. of a 231 ppm. stock solution was poured onto the surface to give 25 lbs. per 6 inches acre. The containers were capped and shaken vigorously 1 hour later. These 8 oz. plasticized containers were incubated for 5–7 days. The containers were then shaken and placed in the greenhouse. Each cup was seeded with 4 cucumber seeds by placing seeds on the surface and covering with ½ inch of sand. After 3–4 weeks, the roots were examined for galls and the response rated on a 0–10 scale where 0 = no control, 5 = 50 percent control and 10 = 100 percent control. A rating of 8–10 qualifies the chemical for secondary testing.

The compounds were also tested against Southern Army worm, pea aphid, confused flour beetle, spider beetle and against resistant mites and were found to be active. The results are as follows.

EXAMPLE 9

1(methylthio)cyclopropanecarboxaldehyde O-(methylcarbamoyl)oxime was formulated to provide emulsifiable concentrates adapted for dispersion in water for application as an insecticidal spray. Emulsifiable concentrate compositions were made by intimately mixing the ingredients listed below using conventional mixing equipment.

| Ingredient | % By Wt. |
|---|---|
| 1-(methylthio)cyclopropanecarboxaldehyde O-(methylcarbamoyl)oxime | 45.8 |
| sodium oleate | 10.08 |
| xylene | 44.2 |

The other compounds of this invention were formulated in like manner. All formulations as prepared hereinabove were diluted with water and applied at an insecticidal application rate of at least 0.25 lbs. per acre of the active insecticidally effective compound per acre. Results are set forth in Tables I, II, and III.

TABLE III

Rating Scale same as Table I

Contact Ovicidal Activity of 1-(Methylthio)cyclopropanecarboxaldehyde O-(Methylcarbamoyl)Oxime

| Concentration (ppm) | Red Banded Leaf Roller | Mexican Bean Beetle | Southern Army Worm |
|---|---|---|---|
| 500 | 10 | 10 | 10 |
| 250 | 10 | 10 | 10 |
| 50 | 9 | 10 | 10 |

TABLE I.—INSECTICIDAL ACTIVITY OF SOME CYCLIC OXIME CARBAMATES

Rating scale 0-10—0 = No effect; 10 = Complete kill

| Compound | Conc. (p.p.m.) | Mexican bean beetle | Mite (contact) Adult | Mite (contact) Nymph | Mite (systemic) Adult | Mite (systemic) Nymph | Aphid Contact | Aphid Systemic | Pea aphid Contact | Pea aphid Systemic |
|---|---|---|---|---|---|---|---|---|---|---|
| 1-(methylthio)-cyclopropanecarboxaldehyde O-(methylcarbamoyl) oxime | 250 | 10 | 10 | | 10 | 10 | 10 | 10 | 8 | 10 |
| | 50 | 10 | 8 | 4 | 9 | 8 | 10 | 9.5 | 4 | 9 |
| | 10 | 8 | 3.5 | 0 | 6 | 0 | 9 | 5 | 0 | 3 |
| | 5 | 10 | 0 | | 0 | | 5 | 2 | | |
| | 2.5 | 9 | 0 | | 0 | | 3.5 | 0 | | |
| 1-(methylthio)-cyclobutanecarboxaldehyde O-(methylcarbamoyl) oxime | 250 | 9.5 | 10 | 0 | 10 | 10 | 10 | 10 | | |
| | 50 | 0 | 0 | 0 | 0 | 0 | 10 | 10 | | |
| | 10 | 0 | 0 | 0 | 0 | 0 | 8.5 | 7 | | |
| | 5 | | | | | | 5.5 | 2.5 | | |
| 1-(methylsulfinyl)-cyclobutanecarboxaldehyde O-(methylcarbamoyl) oxime | 250 | 9 | 8 | 8 | 10 | 9 | 10 | 10 | | |
| | 50 | 8 | 8 | 3 | 4 | 0 | 10 | 8 | | |
| | 10 | 0 | 0 | 0 | 0 | 0 | 10 | 4.5 | | |
| | 5 | | | | | | 5 | | | |
| 1-(methylsulfonyl)-cyclobutane carboxaldehyde O-(methylcarbamoyl) oxime | 250 | 10 | 0 | 0 | 0 | 0 | 10 | 10 | | |
| | 50 | 4 | | | | | 10 | 10 | | |
| | 10 | | | | | | 7.5 | 4 | | |

| Compound | Conc. (p.p.m.) | Confused flour beetle | Spider beetle | Boll weevil | German cockroach |
|---|---|---|---|---|---|
| 1-(methylthio) cyclopropanecarboxaldehyde O-(methylcarbamoyl) oxime | 250 | 10 | 10 | 10 | 10 |
| | 50 | 10 | 10 | 10 | 8 |
| | 10 | 10 | 10 | 10 | 1 |

TABLE II

Rating Scale 0-10
0 = No control
10 = 100% control-no galls

| Compound | Root Knot Nematode Lbs./Acre |
|---|---|
| 1-(methylthio)-cyclopropanecarboxaldehyde O-(methylcarbamoyl)oxime | 9 at 25<br>7.5 at 12.5<br>4 at 6.25 |
| 1-(methylthio)-cyclobutanecarboxaldehyde O-(methylcarbamoyl)oxime | 10 at 25<br>9.5 at 12.5<br>7 at 6.25 |
| 1-methylsulfinyl)-cyclobutanecarboxaldehyde O-(methylcarbamoyl)oxime | 7 at 25 |
| 1-(methylsulfonyl)-cyclobutanecarboxaldehyde O-(methylcarbamoyl)oxime | 10 at 25 |

What is claimed is:

1. A compound of the formula:

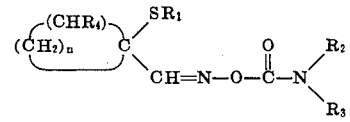

wherein $R_1$ is $C_1$–$C_4$ alkyl and $R_2$, $R_3$ and $R_4$ are independently H or $C_1$–$C_4$ alkyl.

2. A compound according to claim 1, 1-(methylthio)cyclopropanecarboxaldehyde O-(methylcarbamoyl)oxime.

3. A compound according to claim 1, 1-(ethylthio)cyclopropanecarboxaldehyde O-(methylcarbamoyl)oxime.

4. A compound according to claim 1, 1-(methylthio)cyclopropanecarboxaldehyde O-(carbamoyl)oxime.

5. A compound according to claim 1, 1-(methylthio)-2-ethylcyclopropanecarboxaldehyde O-(methylcarbamoyl)oxime.

* * * * *